US012633781B2

(12) United States Patent
Lee et al.

(10) Patent No.: US 12,633,781 B2
(45) Date of Patent: *May 19, 2026

(54) ARTIFICIAL INTELLIGENCE ALGORITHM-BASED WIRELESS CHARGING SYSTEM CAPABLE OF HIGH-SPEED RESPONSE TO ENVIRONMENTAL CHANGES

(71) Applicants:SKAIChips Co., Ltd., Suwon-si (KR); Research & Business Foundation SUNGKYUNKWAN UNIVERSITY, Suwon-si (KR)

(72) Inventors: Kang Yoon Lee, Seoul (KR); Jong Wan Jo, Suwon-si (KR); Dong Gyun Kim, Suwon-si (KR); Sung Jun Byun, Suwon-si (KR); Jae Bin Kim, Suwon-si (KR); Joon Mo Yoo, Guri-si (KR); Young Gun Pu, Suwon-si (KR); Yeon Jae Jung, Seoul (KR); Hyung Ki Huh, Seoul (KR)

(73) Assignees: SKAIChips Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/942,696

(22) Filed: Nov. 9, 2024

(65) Prior Publication Data

US 2025/0070600 A1 Feb. 27, 2025

Related U.S. Application Data

(63) Continuation of application No. 17/733,993, filed on Apr. 29, 2022, now Pat. No. 12,176,726.

(30) Foreign Application Priority Data

Jul. 9, 2021 (KR) ........................ 10-2021-0090155

(51) Int. Cl.
*H02J 50/20* (2016.01)
*H02J 7/82* (2026.01)
(Continued)

(52) U.S. Cl.
CPC ................ *H02J 50/20* (2016.02); *H02J 7/82* (2026.01); *H02J 50/001* (2020.01);
(Continued)

(58) Field of Classification Search
None
See application file for complete search history.

(56) References Cited

U.S. PATENT DOCUMENTS

2012/0200158 A1 8/2012 Takei
2012/0309295 A1 12/2012 Maguire
(Continued)

FOREIGN PATENT DOCUMENTS

KR 10-2013-0005570 A 1/2013
KR 10-2017-0014959 A 2/2017
(Continued)

OTHER PUBLICATIONS

Notice of Allowance mailed Nov. 30, 2021 from Korean Intellectual Property Office for Korean Application No. 10-2021-0090155.
(Continued)

*Primary Examiner* — Daniel Cavallari
*Assistant Examiner* — Joel Barnett

(57) ABSTRACT

Disclosed are an artificial intelligence algorithm-based wireless power transmitter, wireless power receiver, and wireless power charging system that are capable of high-speed response to environmental changes and that can optimize the
(Continued)

RF SIGNAL power efficiency of a wireless power receiver, estimate a dynamic location from a signal received from the wireless power receiver using artificial intelligence technology, and dynamically transmit wireless power to a prioritized wireless power receiver according to a power state.

5 Claims, 8 Drawing Sheets

(51) Int. Cl.
    *H02J 50/00*     (2016.01)
    *H02J 50/40*     (2016.01)
    *H02J 50/90*     (2016.01)

(52) U.S. Cl.
    CPC ............ *H02J 50/402* (2020.01); *H02J 50/90* (2016.02); *H02J 2207/20* (2020.01); *H02J 2207/50* (2020.01)

(56) References Cited

U.S. PATENT DOCUMENTS

| | | | |
|---|---|---|---|
| 2015/0032052 A1 | 1/2015 | Guardiani et al. | |
| 2015/0137746 A1 | 5/2015 | Lee et al. | |
| 2015/0155739 A1 | 6/2015 | Walley et al. | |
| 2015/0200562 A1* | 7/2015 | Kilinc | H02J 50/10 |
| | | | 320/108 |
| 2019/0022394 A1* | 1/2019 | Fayram | H02J 50/90 |
| 2019/0103670 A1 | 4/2019 | Liou et al. | |
| 2019/0140459 A1* | 5/2019 | Huff | H01M 10/425 |
| 2021/0101680 A1* | 4/2021 | Naderi | H02J 50/402 |
| 2021/0184508 A1 | 6/2021 | Lee et al. | |

FOREIGN PATENT DOCUMENTS

| | | |
|---|---|---|
| KR | 10-2018-0107012 A | 10/2018 |
| KR | 10-2019-0080728 A | 7/2019 |
| KR | 10-2020-0088584 A | 7/2020 |
| KR | 10-2020-0022734 A | 6/2021 |

OTHER PUBLICATIONS

Extended European Search Report mailed Nov. 16, 2022 for European Application No. 22174825.4.
Non-final Office Action mailed on Jun. 10, 2024 from the USPTO for U.S. Appl. No. 17/773,993.
Notice of Allowance mailed on Oct. 18, 2024 from the USPTO for U.S. Appl. No. 17/773,993.

* cited by examiner (a)

(b)

(a)

(b)

ARTIFICIAL INTELLIGENCE ALGORITHM-BASED WIRELESS CHARGING SYSTEM CAPABLE OF HIGH-SPEED RESPONSE TO ENVIRONMENTAL CHANGES

CROSS-REFERENCE TO RELATED APPLICATION(S)

This application is a continuation application of U.S. application Ser. No. 17/733,993, filed on Apr. 29, 2022, which claims priority from Korean Patent Application No. 10-2021-0090155, filed on Jul. 9, 2021, in the Korean Intellectual Property Office, the disclosures of which are incorporated herein by reference in their entirety.

BACKGROUND

1. Field

The following description relates to an artificial intelligence algorithm-based multi-device wireless charging system capable of high-speed response to environmental changes, and more particularly, to an artificial intelligence algorithm-based multi-device wireless charging system that is capable of high-speed response to environmental changes and that can optimize the power efficiency of a wireless power receiver, estimate a dynamic location from a signal received from the wireless power receiver using artificial intelligence technology, and dynamically transmit wireless power to a prioritized wireless power receiver according to a power state.

2. Description of Related Art

With the development of Internet of Things (IoT) technology, the number of IoT sensors is increasing exponentially. IoT sensors have a power supply source, a communication chipset, and a processor inside. Accordingly, IoT sensors may collect various data at installation locations and transmit the collected data through an IoT communication network or a mobile communication network or perform a designated function according to control data received through an IoT communication network or a mobile communication network.

Such an IoT sensor requires the supply of power to a communication chipset and a processor and the changing of the power source in order to keep operating normally. Wired charging systems not only require the connection of charging lines to IoT sensors but also restrict the mobility of IoT sensors, and thus it difficult to arrange the IoT sensors.

Short-distance wireless charging systems may be an alternative to solve the shortcomings of the wired charging systems, but have a limitation in terms of the charging distance and have the disadvantage of being able to charge only an IoT sensor equipped with one receiving (Rx) coil using one transmitting (Tx) coil.

Alternatively, a remote wireless charging technology using radio frequency (RF) signals has been developed. Remote wireless charging systems are configured to charge a power source of an IoT sensor using RF signals in the 2.4 GHz or 5.8 GHz industrial scientific and medical (ISM) band. Location detection of the IoT sensor is essential to increase the efficiency of power charging, which leads to the fixed power consumption of the IoT sensor and a power wastage problem due to lack of accuracy of beam steering.

As described above, there is a need for a wireless charging system that uses RF signals and that may optimize the power consumed in a wireless power receiver for wireless power charging and provide wireless power to the wireless power receiver according to priority on the basis of RF signals being received and transmitted.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention has been devised to solve the above-described problems and is directed to providing a wireless power transmitter, a wireless power receiver, and a wireless power charging system that can dynamically maximize wireless power charging efficiency by using artificial intelligence technology in response to external environmental changes.

Also, the present invention is directed to providing a wireless power transmitter, a wireless power receiver, and a wireless power charging system that can optimize consumed power consumed based on received wireless power and an internal power state and minimize energy waste for wireless power charging in a wireless power receiver.

Also, the present invention is directed to providing a wireless power transmitter, a wireless power receiver, and a wireless power charging system that can dynamically estimate the location of a wireless power receiver on the basis of a transmitted RF signal and an RF signal received in response to the transmitted RF signal and dynamically determine the charging priority of the wireless power receiver according to the received RF signal using artificial intelligence technology.

Also, the invention is directed to providing a wireless power transmitter, a wireless power receiver, and a wireless power charging system that can dynamically increase wireless power charging efficiency by training an artificial intelligence technology algorithm for performing location estimation, location determination, and beam steering for wireless power transmission using transmitted RF signals and received RF signals.

Also, the present invention is directed to providing a wireless power transmitter, a wireless power receiver, and a wireless power charging system that can minimize the time required for the dynamic change of a wireless power output according to a change in priority caused by the location tracking and power statues of a wireless power receiver and a corresponding response time.

Effects of the invention are not limited to the aforementioned effects, and other effects that are not described herein should be clearly understood by those skilled in the art from the following description.

According to an aspect of the present invention, there is provided a wireless power receiver including a radio frequency (RF) signal detector configured to detect one or more characteristics of an RF signal received through an RF receiving antenna, an RF reception controller configured to compose and output received-power information based on the detected characteristics, and a backscatter modulator configured to encode the received-power information received from the RF reception controller into an amplitude modulation (AM) signal and output the AM signal to an AM transmitting antenna.

The wireless power receiver may further include a radio frequency (RF)-to-direct current (DC) converter configured to convert the RF signal into a DC voltage, a supercapacitor charged according to the DC voltage received from the RF-to-DC converter, and a power detector configured to detect a power level stored in the supercapacitor, wherein the RF reception controller may further compose and output stored-power information corresponding to the power level received from the power detector, and the backscatter modulator may encode an identifier, the received-power information, and the stored-power information into an AM signal and output the AM signal to the AM transmitting antenna.

The RF signal detector, the RF reception controller, and the backscatter modulator may be embedded in a single integrated circuit (IC) for wireless power charging through an RF signal, and the RF signal may be a signal in an industrial, scientific, and medical (ISM) band.

The RF reception controller may output a control signal to the backscatter modulator to output a multi-tone AM signal when received wireless power based on the detected characteristics is greater than or equal to a first set threshold and may output a control signal to the backscatter modulator to output a single-tone AM signal when the received wireless power is between the first set threshold and a second set threshold.

The RF reception controller may output a control signal for stopping the backscatter modulator from outputting the AM signal when the received wireless power is less than the second set threshold.

The RF reception controller may output a control signal for outputting a multi-tone AM signal or a control signal for outputting a single-tone AM signal according to received wireless power based on the detected characteristics to the backscatter modulator when the power level detected by the power detector is greater than or equal to a set threshold power level.

The RF reception controller, which includes an analog process in memory (PIM), may generate a control signal corresponding to one or more characteristics received from the RF signal detector through a convolutional neural network (CNN) artificial intelligence algorithm that uses a convolution operation of the analog PIM and may output the control signal to the RF-to-DC converter and the backscatter modulator.

The RF-to-DC converter may include a parallel RF-to-DC converting module in which a plurality of RF-to-DC elements are disposed in parallel, a serial RF-to-DC converting module in which a plurality of RF-to-DC elements are disposed in series, and a selective output module configured to output the RF signal received from the RF receiving antenna to the parallel RF-to-DC converting module or the serial RF-to-DC converting module according to a mode control signal.

The RF signal may be a signal output from the wireless power transmitter for wireless power transmission in a 900 MHz band, a 2.4 GHz band, or a 5.8 GHz band, and the single IC may charge, with wireless power of the RF signal, a battery for supplying driving power to an electronic component of the wireless power receiver.

The RF signal detector may detect characteristics of an energy level, a phase, and a peak-to-average power ratio of the RF signal.

Also, according to another aspect of the present invention, there is provided a wireless power transmitter including a plurality of radio frequency (RF) transmitting antennas configured to wirelessly transmit RF signals, a plurality of wireless power transmitting modules connected to the plurality of RF transmitting antennas and configured to output wireless power to the connected RF transmitting antennas, a feedback receiving module configured to receive amplitude modulation (AM) signals from one or more wireless power receivers and extracting received-power information from the received AM signals, and an RF transmission controller configured to recognize locations of one or more wireless power receivers on the basis of the received-power information extracted from the AM signals and control the plurality of wireless power transmitting modules according to the recognized locations to transmit the wireless power as an RF signal.

The wireless power transmitting module may include a phase-locked loop (PLL) configured to generate an RF signal in a designated industrial, scientific and medical (ISM) band, a phase shifter configured to phase-shift the generated RF signal; and a power amplifier configured to amplify the phase-shifted RF signal.

The RF transmission controller may include an artificial intelligence (AI) engine block configured to accelerate an AI algorithm, a central processing unit configured to control the AI engine block to execute a plurality of designated artificial intelligence models and configured to control the plurality of wireless power transmitting modules according to the determined locations and priorities of the wireless power receivers to steer beams of the RF signal, and a memory configured to store data according to the execution of the artificial intelligence model.

The plurality of wireless power transmission modules, the feedback receiving module, and the RF transmission controller may be embedded in a single IC for RF signal-based wireless power transmission, and the RF signal may be a signal output for wireless power transmission in a 900 MHz band, a 2.4 GHz band, or a 5.8 GHz band.

The central processing unit that executes the plurality of artificial intelligence models by controlling the AI engine block may determine location candidates according to a first convolutional neural network (CNN) model for location candidate generation using received-power information of the wireless power receiver received within a first designated time window, determine the location of the wireless power receiver according to a recurrent neural network (RNN) model using the determined location candidates, determine output data of the phase value and amplification value of each of the plurality of wireless power transmitting modules according to a second CNN model on the basis of priority determined based on further received stored-power information of the wireless power receiver, and control the plurality of wireless power transmitting modules according to the determined output data.

The received-power information may include data for specifying the amount of energy of wireless power harvested by the wireless power receiver from RF signals transmitted through the plurality of RF transmitting antennas, and the stored-power information may include data for specifying the amount of battery charge stored in the wireless power receiver.

The central processing unit may match received-power information received from one or more wireless power receivers during a second time window subsequent to the first designated time window to the output data in the first time window, store the received-power information matched to the output data in the memory, and use the matched received-power information and output data as real-time learning data for the plurality of artificial intelligence models.

The RF transmission controller may further include a bit compressor configured to compress data bits according to the difference, word transform, and XOR operation between adjacent words of a data block, and the RF transmission controller may compress the output data or weights used for the plurality of artificial intelligence models through the bit compressor and store the compressed output data or weights in the memory.

The RF transmission controller may dynamically track the location of the wireless power receiver according to the received-power information extracted from the AM signal and the control signal output to the plurality of wireless power transmitting modules.

Also, according to an aspect of the present invention, there is provided a wireless power charging system including a wireless power transmitter configured to transmit an RF signal for wireless power charging and a plurality of wireless power receivers configured to receive an RF signal and charge an internal capacitor with the received RF signal.

The wireless power receiver may charge an internal supercapacitor according to the recognition of an RF signal transmitted from the wireless power transmitter and output a fed-back AM signal through an AM transmitting antenna in response to the recognition of the RF signal, wherein the AM signal includes received-power information including an energy level, a phase, and a peak-to-average power ratio of an RF signal sensed by the wireless power receiver, and the AM signal has an amplitude proportional to stored power or received power of the wireless power receiver.

The AM signal may be a tone signal in the 2.4 GHz band, a tone signal in the 5.8 GHz, or a two-tone signal in the 2.4 GHz band and the 5.8 GHz band.

The wireless power transmitter may receive AM signals from a plurality of wireless power receivers, estimate the locations of the plurality of wireless power receivers by applying artificial intelligence technology using received-power information and stored-power information of the AM signal, assign wireless power reception priority to the wireless power receiver of which the location is estimated, and transmit an RF signal to the wireless power receiver selected according to the assigned priority.

The wireless power receiver is an Internet of things (IoT) sensor.

Other features and aspects will be apparent from the following detailed description, the drawings, and the claims.

Figure 1:
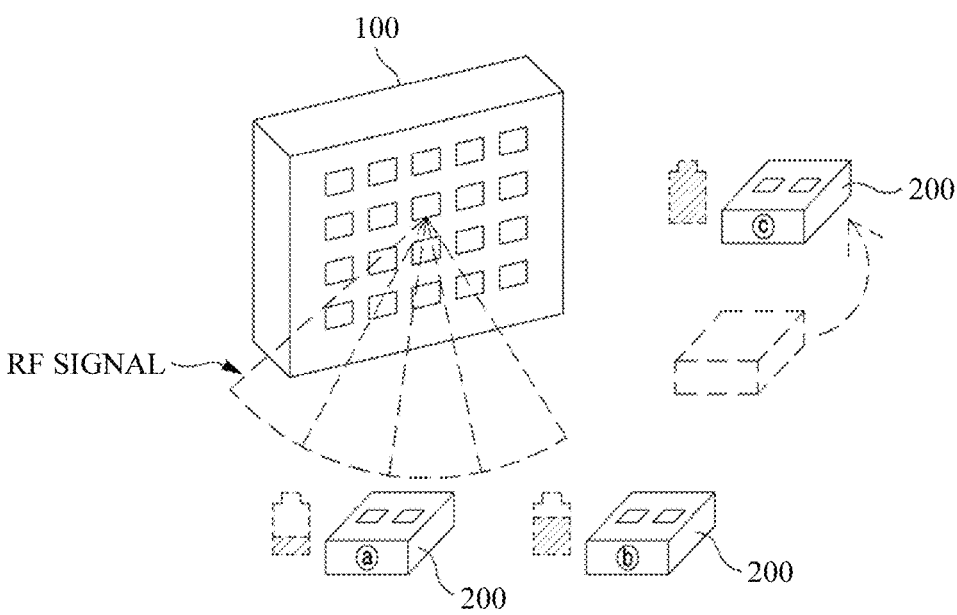
FIG. 1 is a diagram showing an exemplary configuration of a wireless power charging system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The above-described objects, features and advantages will become more apparent through the following detailed description with reference to the accompanying drawings, and accordingly, those skilled in the art will be able to easily implement the technical spirit of the present invention. In addition, in describing the invention, when it is determined that the detailed description of the known technology related to the invention may unnecessarily obscure the gist of the invention, the detailed description thereof will be omitted. Hereinafter, preferred embodiments of the present invention will be described in detail with reference to the accompanying drawings.

FIG. 1 is a diagram showing an exemplary configuration of a wireless power charging system.

Referring to FIG. 1, the wireless power charging system is configured to include a wireless power transmitter 100 and one or more wireless power receivers 200 (ⓐ, ⓑ, ⓒ). The wireless power charging system may be installed in various places. For example, the wireless power charging system may be installed in production facilities or equipments such as factories, business sites, and work sites or may be installed in private residences such as apartments and detached houses or in public places.

The wireless power charging system will be briefly described with reference to FIG. 1. The wireless power transmitter 100 transmits a radio frequency (RF) signal for wireless power charging. The wireless power transmitter 100 is (fixedly installed at a specific location and is configured to transmit the RF signal to an arbitrary or registered wireless power receiver 200 through multiple RF transmitting antennas 150.

The RF signal used for charging an internal capacitor provided in the wireless power receiver 200 and output by the wireless power transmitter 100 may be a signal in an industrial, scientific and medical (ISM) band. The RF signal output from the wireless power transmitter 100 for wireless power transmission is, for example, a wireless signal in the 900 MHz band (902 to 928 MHZ), the 2.4 GHz band (2.4 to 2.48 GHz), the 5.8 GHz band (5.725 to 5.875 GHZ) or the 24 GHz band (24 to 24.25 GHZ).

The wireless power transmitter 100 estimates the location of the wireless power receiver 200 on the basis of received power information of an amplitude modulation (AM) signal received from the wireless power receiver 200 by applying artificial intelligence technology. The wireless power transmitter 100 is configured to give priority corresponding to stored-power information of the AM signal to the wireless power receiver 200 of which the location is estimated, control the intensity (amplitude) and phase of the RF signal such that the wireless power receiver 200 selected according to priority assignment has the highest power receiving efficiency, and transmit the RF signal for wireless power charging to the wireless power receiver 200 (which is selected due to the highest priority) (e.g., ⓐ having the smallest battery storage capacity in FIG. 1) through RF transmitting antennas 150, which are patch antennas.

The detailed configuration and operations of the wireless power transmitter 100 will be described in detail below with reference to FIG. 5 and the preceding drawings.

Each of the plurality of wireless power receivers 200 receives an RF signal and charges an internal capacitor (e.g., a battery) using the received RF signal. The wireless power receiver 200 may be a stationary device or a mobile device. The wireless power receiver 200 may be, for example, a mobile device that a general user can carry, such as a smartphone, a tablet PC, or a portable device. Alternatively, the wireless power receiver 200 may be an Internet of Things (IoT) sensor. An IoT sensor, which is a stationary sensor or a mobile sensor, may collect or sense various kinds of signals from external sources and may process a designated function according to the sensed signal or transmit data corresponding to the sensed signal through a connected wireless network.

The wireless power receiver 200 receives an RF signal for wireless power charging from the wireless power transmitter 100, etc., and harvests power from the RF signal according to the recognition of the RF signal to charge an internal supercapacitor 230.

Also, the wireless power receiver 200 generates an AM signal in response to the recognition of the RF signal and outputs the generated AM signal through an AM transmitting antenna 290 as a feedback signal for the recognized RF signal. The wireless power receiver 200 includes a backscattering circuit to transmit an AM signal in response to the recognition of the RF signal.

The AM signal output to the wireless power transmitter 100 includes power information related to the wireless power receiver 200 according to a format agreed with the wireless power transmitter 100. The AM signal may be configured to include power information that can indicate or specify the amount of power received (harvested) from the RF signal (hereinafter referred to as "received-power information") and an identifier (ID) of the wireless power receiver 200 and further include power information that can indicate or specify the current stored power of the wireless power receiver 200 (hereinafter referred to as "stored-power information").

For example, the received-power information is configured to include the energy level, phase, and peak-to-average power ratio of the RF signal sensed by the wireless power receiver 200 in a specific number of bits according to an agreed format. The stored-power information indicates the remaining power level of the battery (supercapacitor 230) of the wireless power receiver 200 and is included in a specific number of bits according to an agreed format. The identifier of the wireless power receiver 200 may be formed as a serial number, a MAC address, or a combination of numbers and characters.

The wireless power receiver 200 is configured to output (backscatter) an AM signal according to the recognition of an RF signal, and the wireless power receiver 200 outputs a single-tone AM signal or output a multi-tone (e.g., two-tone) AM signal.

For example, the wireless power receiver 200 outputs a tone signal in the 2.4 GHz ISM band as an AM signal or outputs a tone signal in the 5.8 GHZ ISM band as an AM signal. Alternatively, the wireless power receiver 200 may output two tone signals as AM signals according to the received power or the internal stored power. The wireless power receiver 200 may output one tone signal in the 2.4 GHz band and another tone signal in the 5.8 GHz band as AM signals at the same time.

The amplitudes of the AM signals output from the wireless power receiver 200 are different. For example, the wireless power receiver 200 may generate an AM signal having an amplitude proportional to the magnitude of the received power that is received through the RF signal. Alternatively, the wireless power receiver 200 may generate and output an AM signal having the amplitude proportional to the magnitude of stored power that is internally stored.

In this way, the wireless power receiver 200 may output an AM signal in an amplitude modulation (AM) scheme. Thus, there is no need to compose a circuit such as a phase-locked loop (PLL) inside compared to other modulation schemes, thereby reducing power consumption. Also, the wireless power receiver 200 can effectively reduce power consumed for transmitting an AM signal compared to available power by changing the amplitude of the AM signal according to the received power or the stored power. The wireless power transmitter 100 may perform demodulation and information extraction on the AM signal having the variable amplitude using a simple circuit structure compared to other modulation schemes such as frequency modulation (FM) or phase modulation (PM).

The wireless power receiver 200 will be described in more detail below with reference to FIGS. 2 to 4.

The wireless power charging system as in the example of FIG. 1 charges the wireless power receiver 200 using an RF signal in an ISM band instead of using a wired line or short-distance or contact wireless power. The wireless power receiver 200, such as an IoT sensor, may dynamically move in a wireless power charging range. A plurality of wireless power receivers 200 that require charging may be located in the wireless power charging system.

Unlike a charging scheme using wired charging, short-distance charging, or contact charging, a charging scheme using an RF signal has various considerations. A wireless power charging system using an RF signal as a charging source needs to increase charging efficiency in the wireless power receiver 200 and requires targeted wireless charging according to various states of the wireless power receiver 200. In addition, dynamic steering of an RF beam for wireless charging is necessary according to the movement of the wireless power receiver 200 such as the IoT sensor. Moreover, fast processing of such an operation or function is very necessary for the charging efficiency of any wireless power receiver 200.

Figure 2:
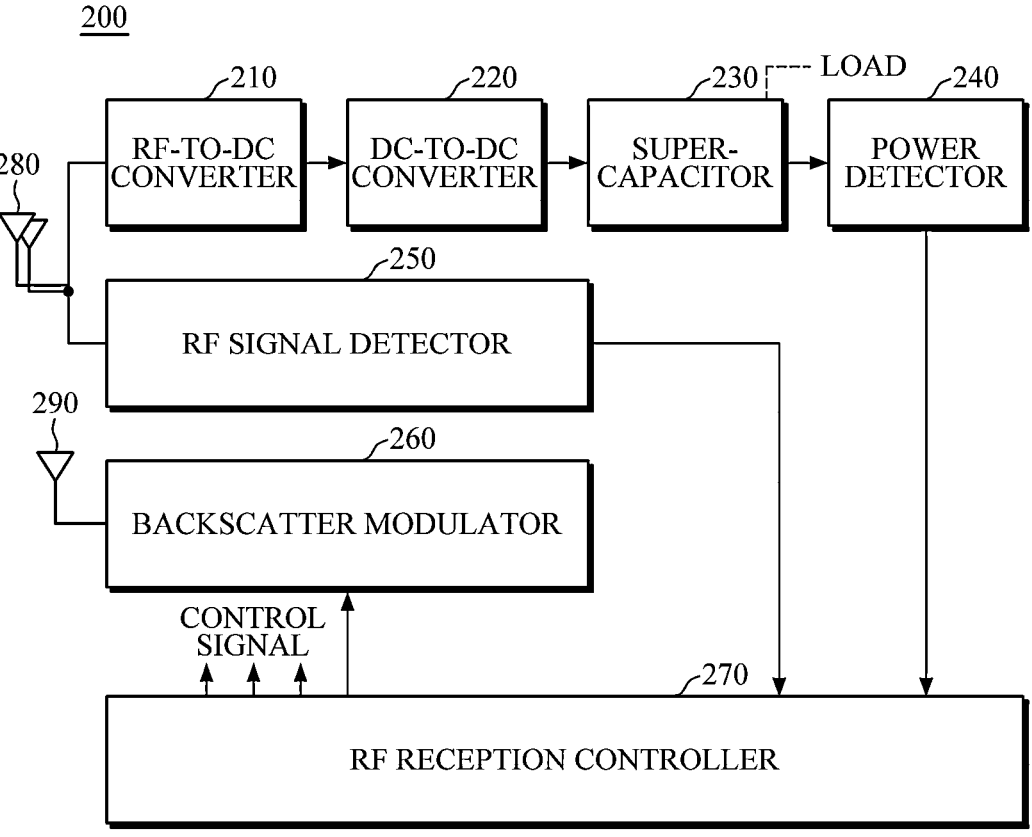
FIG. 2 is a diagram showing an exemplary block diagram of a wireless power receiver.

FIG. 2 is a diagram showing an exemplary block diagram of the wireless power receiver 200.

Referring to FIG. 2, the wireless power receiver 200 includes a radio frequency (RF)-to-direct current (DC) converter 210, a DC-to-DC converter 220, a supercapacitor 230, a power detector 240, an RF signal detector 250, a backscatter modulator 260, an RF reception controller 270, one or more RF receiving antennas 280, and one or two AM transmitting antennas 290. The wireless power receiver 200 further includes other electronic components according to the use, function, purpose, etc., and the electronic components perform set functions and the like using the power of the supercapacitor 230 charged through an RF signal as driving power.

The RF-to-DC converter 210, the DC-to-DC converter 220, the power detector 240, the RF signal detector 250, the backscatter modulator 260, and the RF reception controller 270 of the wireless power receiver 200 are embedded in a single integrated circuit (IC) for charging the supercapacitor 230 with wireless power through an RF signal from the wireless power transmitter 100. A single IC for wireless power charging including these components may further include (have) a supercapacitor 230 therein according to a design example. The single IC is configured to charge, for example, a battery (the supercapacitor 230) such as a lithium ion or lithium polymer battery, which supplies driving power to the electronic components of the wireless power receiver 200, with wireless power harvested from an RF signal.

The wireless power receiver 200 will be described below with reference to FIG. 2. One or more RF receiving antennas 280 receive (recognize) RF signals in a specific frequency band. The RF reception antenna 800 may capture (sense) RF signals in, for example, the 900 MHz band, the 2.4 GHz band, and/or the 5.8 GHz band. The wireless power receiver 200 may have a single RF receiving antenna 280. Alternatively, the wireless power receiver 200 may have a plurality of RF receiving antennas 280 to capture RF signals through the plurality of RF receiving antennas 280.

The RF-to-DC converter 210 is connected to one or more RF receiving antennas 280 to convert RF signals received through the one or more RF receiving antennas 280 into direct current (DC) voltage. The RF-to-DC converter 210 may have a plurality of RF-to-DC elements 213 disposed therein to generate DC voltage with high efficiency through a specific RF-to-DC element 213 according to the signal strength of an RF signal and output the DC voltage. The RF-to-DC converter 210 may convert the captured RF signal into a specific voltage level (e.g., 5V, 12V, 24V, etc.) according to the design of the RF-to-DC element 213 and output the converted RF signal.

The DC-to-DC converter 220 is connected to the RF-to-DC converter 210 to down-converts (or up-converts) a DC voltage received from the RF-to-DC converter 210 into another DC voltage and output the DC voltage. The DC-to-DC converter 220 converts a DV voltage, such as 5V and 12 V, received from the RF-to-DC converter 210 into a DC voltage, such as 5V and 3.3V, suitable for charging the supercapacitor 230.

The supercapacitor 230 is charged according to the DC voltage harvested by the RF-to-DC converter 210 and supplies the charged power to an internal electronic component (a load that uses the power). The supercapacitor 230 includes a storage element capable of storing DC power. For example, the supercapacitor 230 may be a lithium ion or lithium polymer battery or may have other DC power storage devices. The supercapacitor 230 may be embedded in a single IC including several blocks or may be embedded in the wireless power receiver 200 separately from the single IC.

The power detector 240 is connected to the supercapacitor 230 to detect a power level stored in the supercapacitor 230 and output an analog or digital signal indicating the detected power level. The power detector 240 outputs a power level capable of specifying the capacity of power stored in the supercapacitor 230 as an analog signal or a digital signal on the basis of the voltage of, or the voltage and current of, the supercapacitor 230. The power detector 240 is configured to include a circuit for sensing the stored power of the supercapacitor 230.

The RF signal detector 250 is connected to the RF receiving antenna 280 to detect the characteristics of an RF signal received through the RF receiving antenna 280 and output the detected characteristic signal. The RF signal detector 250 may be configured to include an energy level detector for detecting an energy level of a captured RF signal, a page detector for detecting the phases (the difference between the phases) of RF signals received from a plurality of RF receiving antennas 280, and a peak-to-average power ratio (PAPR) calculator for detecting the peak (peak power) and average (average power) of RF signals and calculating a peak-to-average power ratio using the peak and the average. As described above, the RF signal detector 250 may detect characteristics such as the energy level, phase, and peak-to-average power ratio of a captured RF signal.

The RF signal detector 250 may output characteristics, such as energy level, page, and PAPR indicating power characteristics, of the RF signal detected from the RF signal as an analog signal or a digital signal of one or more bits. One or more characteristic signal output from the RF signal detector 250 may specify the received-power state of the RF signal captured for power harvesting by the wireless power receiver 200.

The AM transmitting antenna 290 transmits an AM signal generated according to the recognition of the RF signal in a wireless manner. The AM transmitting antenna 290 may transmit a backscattered AM signal corresponding to the recognition of the RF signal. The AM transmitting antenna 290 may transmit an AM signal of a specific single-tone frequency or an AM signal of a multi-tone frequency. The wireless power receiver 200 may have one AM transmitting antenna 290 to transmit a single- or multi-tone AM signal through the single AM transmitting antenna 290 or may have a plurality of AM transmitting antenna 290 to transmit multi-tone AM signals through the plurality of AM transmitting antennas 290.

A specific one tone AM signal wirelessly transmitted through the AM transmitting antenna 290 is, for example, a signal encoded at a radio frequency in the 2.4 GHz band according to an amplitude modulation scheme. Another tone AM signal is, for example, a signal encoded at a radio frequency in the 5.8 GHz band according to an amplitude modulation scheme.

An AM signal according to the present invention is configured to change the magnitude of the amplitude of a transmitted radio frequency signal. Accordingly, it is possible to provide efficient power state feedback according to the power state of the wireless power receiver 200, and thus the wireless power receiver 200 may have optimal energy efficiency.

The backscatter modulator 260 encodes data received from the RF reception controller 270 into an AM signal and outputs the AM signal to the AM transmitting antenna 290. The backscatter modulator 260 encodes an identifier and reception-power information, which are received from the RF reception controller 270, and stored-power information into an AM signal of a specific tone frequency and output the AM signal to the AM transmitting antenna 290.

The backscatter modulator 260 receives an amplitude-magnitude control signal from the RF reception controller 270, generates an AM signal having an amplitude corresponding to the amplitude-magnitude control signal using a tone frequency (e.g., a frequency in the 2.4 GHz band or a frequency in the 5.8 GHz band), and outputs the AM signal to the AM transmitting antenna 290. The backscatter modulator 260 converts the bits of the identifier, the received-power information, and the stored-power information according to a (bit) encoding scheme agreed with the wireless power transmitter 100 into an AM signal of a tone frequency having an amplitude corresponding to the amplitude-magnitude control signal and outputs the AM signal.

For example, the backscatter modulator 260 may encode a bit "1" in the identifier or information into a tone frequency scaled according to the amplitude-magnitude control signal and encode a bit "0" into a zero frequency (the absence of a tone frequency). Also, the backscatter modulator 260 may adjust a duty ratio of the tone frequency of the AM signal according to a duty ratio control signal received from the RF reception controller 270.

The backscatter modulator 260 may generate a single-tone or a multi-tone AM signal according to a tone-mode control signal received from the RF reception controller 270 and output the AM signal to the single AM transmitting antenna 290 or the plurality of AM transmitting antennas 290. The backscatter modulator 260 may transmit the AM signal or stop the transmission (operation) according to an on/off control signal. The backscatter modulator 260 is configured as a circuit.

The RF reception controller 270 controls the blocks of the wireless power receiver 200 to have high charging efficiency and a long lifetime corresponding to available power. The RF reception controller 270 controls the other blocks according to the recognition of the RF signal for charging to compose the identifier of the wireless power receiver 200, the received-power information based on one or more characteristics detected by the RF signal detector 250, and the stored-power information corresponding to the power level received from the power detector 240 and output the identifier, the received-power information, and the stored-power information through the AM signal.

The RF reception controller 270 receives one or more characteristic signals from the RF signal detector 250. When received wireless power calculated or determined according to the received characteristic signals is less than a preset lower limit threshold, the RF reception controller 270 outputs an off-control signal to the backscatter modulator 260 to stop the operation of the backscatter modulator 260 and thus stop the output of the AM signal through the backscatter modulator 260. Accordingly, when wireless power for charging is not recognized from external environments, the wireless power receiver 200 stops the operation of an internal feedback circuit (the backscatter modulator 260), thereby effectively reducing power consumption.

The control performed by the RF reception controller 270 in relation to the transmission of an AM signal will be described in more detail below. The RF reception controller 270 receives characteristic signals such as energy level, phase and PAPR of a recognized RF signal from the RF signal detector 250 and calculates (the amount of) received wireless power on the basis of the received energy level, phase, and PARR. The RF reception controller 270 outputs an off-control signal to the backscatter modulator 260 when (the amount of) received wireless power is less than the lower limit threshold and outputs an on-control signal to the backscatter modulator 260 when the received wireless power is greater than or equal to the lower limit threshold.

When the received wireless power is greater than or equal to the lower limit threshold, the RF reception controller 270 composes the received-power information. The configured received-power information may include energy level, phase, and/or PAPR and/or (the amount of) received wireless power calculated therefrom. Also, the RF reception controller 270 composes the corresponding stored-power information according to the signal of the power level detected by the power detector 240. The stored-power information indicates the remaining power level of the supercapacitor 230 of the wireless power receiver 200. The RF reception controller 270 outputs the internally stored or set identifier, the configured received-power information, and the stored-power information to the backscatter modulator 260.

When the calculated amount of received power is greater than or equal to a set two-tone threshold (the two-tone threshold is a threshold higher than the lower limit threshold) (e.g., when a sufficient amount of power is being received from the RF signal), the RF reception controller 270 outputs, to the backscatter modulator 260, a tone-mode control signal for performing control such that an AM signal with a plurality of tones (at least two tone frequencies) is generated and output. Furthermore, the RF reception controller 270 outputs, to the backscatter modulator 260, the amplitude-magnitude control signal for allowing the two-tone AM signal output over a set two-tone threshold to have the magnitude of the amplitude proportional to the calculated amount of received power. Also (alternatively), the RF reception controller 270 may output a duty ratio control signal for setting a duty ratio of a frequency proportional to the calculated amount of received power of two tones.

When the calculated amount of received power is less than the two-tone threshold and is greater than or equal to the set lower limit threshold (e.g., when the amount of power received from the RF signal is not sufficient and allows feedback), the RF reception controller 270 outputs a tone-mode control signal for generating and outputting a single-tone AM signal to the backscatter modulator 260.

Furthermore, the RF reception controller 270 outputs, to the backscatter modulator 260, the amplitude-magnitude control signal for allowing the single-tone AM signal that is less than the two-tone threshold and greater than or equal to the set lower limit threshold to have the magnitude of the amplitude proportional to the calculated amount of received power. Also (alternatively), the RF reception controller 270 may output a duty ratio control signal for setting a duty ratio of a frequency proportional to the calculated amount of received power of a single tone.

Even when the calculated amount of received power is less than the two-tone threshold, the RF reception controller 270 outputs, to the backscatter modulator 260, a control signal for outputting a single-tone or a multi-tone AM signal depending on the power level detected by the power detector 240.

For example, when a power level signal received from the power detector 240 is greater than or equal to an internally set threshold power level (e.g., 30%, 50%, etc.), the RF reception controller 270 outputs a tone-mode control signal for outputting a multi-tone AM signal to the backscatter modulator 260 or outputs a tone-mode control signal for outputting a single-tone AM signal to the backscatter modulator 260 depending on the received wireless power based one or more characteristics detected through the RF signal detector 250. Accordingly, even if the received power from the wireless power transmitter 100 is low, when the internal storage power is greater than a certain value, the reception state of the wireless power receiver 200 may be notified, and accordingly, the wireless power with higher efficiency may be dynamically received.

The RF reception controller 270 may perform control related to wireless charging and backscattering of the wireless power receiver 200 through execution of a control algorithm, a control logic, a control program, and the like. Preferably, the RF reception controller 270 may include a central processing unit (CPU) and an artificial intelligence (AI) block for performing an artificial intelligence algorithm therein to perform an artificial intelligence algorithm model. Thus, the RF reception controller 270 may perform wireless charging control through the control of the RF-to-DC converter 210 and the DC-to-DC converter 220 and/or backscattering-related control through the control of the RF signal detector 250 and the backscatter modulator 260.

The AI block internally configured to improve the performance speed of the RF reception controller 270 with quick response and quick feedback and optimally charge wireless power includes an analog process in memory (PIM) therein. The RF reception controller 270 performs a convolutional neural networks (CNN) artificial intelligence algorithm model that uses the convolution operation of the analog PIM.

The analog PIM is configured to include an analog static random access memory (SRAM) matrix configured to store an analog value of a weight matrix of a convolution layer, a plurality of digital-to-analog converters (DACs) for converting an input matrix of a convolution operation into an analog signal, a plurality of analog operation element (e.g., a circuit using capacitors or the like) for performing an analog operation (e.g., multiplication) on each of a weight analog signal of the SRAM matrix and analog signal of the DACs, and a plurality of analog-to-digital converters (ADCs) for converting the analog signal obtained through the operation into a digital signal.

The analog PIM may store weights and perform a matrix operation (a convolution operation) with a smaller area and lower power than those of a matrix multiplier consisting of digital operations. As described above, the analog PIM can perform, with low power and a low area, a convolution operation of a CNN artificial intelligence algorithm model.

The RF reception controller 270 configured to include the analog PIM inputs one or more characteristic signals received from the RF signal detector 250 to the CNN artificial intelligence algorithm and outputs an on/off control signal, an amplitude-magnitude control signal, a duty ratio control signal, and/or a tone-mode control signal to the backscatter modulator 260 according to an output of the CNN artificial intelligence algorithm of the AI block including the analog PIM.

Also, the RF reception controller 270 configured to include the analog PIM inputs one or more characteristic signals received from the RF signal detector 250 to the CNN artificial intelligence algorithm, and generates a control signal for controlling the RF-to-DC converter 210 and then outputs the control signal to the RF-to-DC converter 210 according to an output of the CNN artificial intelligence algorithm of the AI block including the analog PIM.

Figure 3:
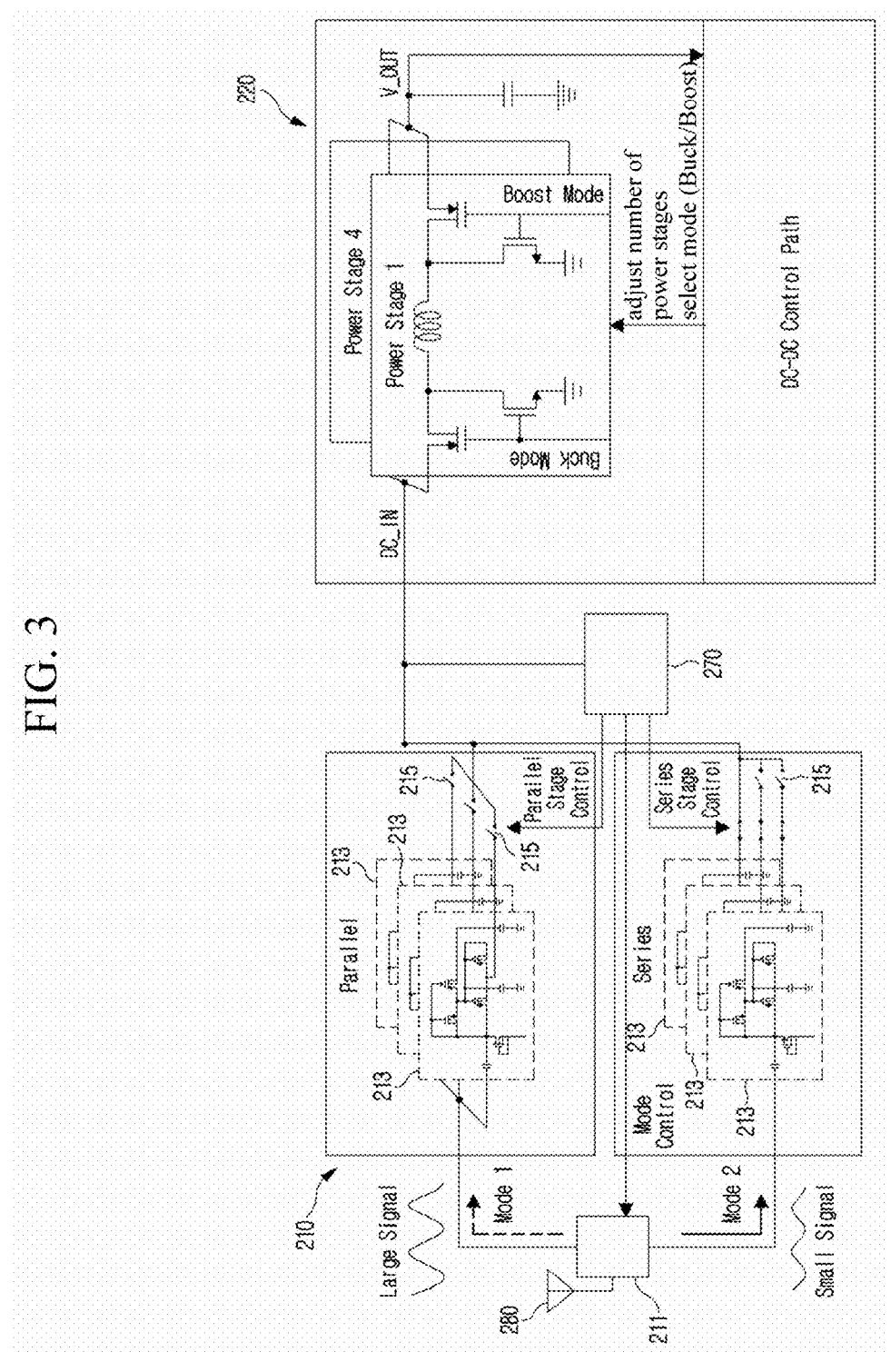
FIG. 3 is a diagram showing an exemplary circuit configuration of some blocks of a wireless power receiver.

FIG. 3 is a diagram showing an exemplary circuit configuration of some blocks of the wireless power receiver 200. FIG. 4A is a diagram showing an exemplary circuit configuration of the RF-to-DC element 213, and FIG. 4B is a diagram showing a specific circuit configuration of the DC-to-DC converter 220 of FIG. 3.

As can be seen from FIG. 3, the RF-to-DC converter 210 is configured to include a parallel RF-to-DC converting module, a series RF-to-DC converting module, and a selective output module 211 such that the modules can be reconfigured according to the characteristics of the RF signal.

The parallel RF-to-DC converting module is configured to include a plurality of RF-to-DC elements 213 connected to each other in parallel and an on/off switch 215 connected thereto. The parallel RF-to-DC converting module may convert, with high efficiency, a strong (large) RF signal into a DC voltage and may decrease power dissipation due to the nonlinearity of an RF signal.

The serial RF-to-DC converting module is configured to include a plurality of RF-to-DC elements 213 connected to each other in series and an on/off switch 215 connected thereto. In the serial RF-to-DC converting module, the plurality of RF-to-DC elements 213 are connected to one another in series to satisfy the minimum operating condition of the DC-to-DC converter 220 from a weak (small) RF signal.

Each of the RF-to-DC elements 213 for converting an RF signal into DC power may be implemented as a circuit shown in FIG. 4A. Alternatively, the RF-to-DC elements 213 may be implemented as a voltage multiplier circuit or a Dickson charge pump circuit.

The selective output module 211 is connected to the RF receiving antenna 280 to output an RF signal from the RF receiving antenna 280 to a parallel RF-to-DC converting module or a serial RF-to-DC converting module according to a mode control signal received from the RF reception controller 270.

The RF reception controller 270 inputs one or more characteristic signals received from the RF signal detector 250 to the CNN artificial intelligence algorithm according to an output of the CNN artificial intelligence algorithm of the AI block including the analog PIM, and generates a control signal for controlling the RF-to-DC converter 210 and then outputs the control signal to the RF-to-DC converter 210. For example, the RF reception controller 270 outputs, to the RF-to-DC converter 210, a mode control signal for controlling the selective output module 211, a parallel stage control signal of the parallel RF-to-DC converting module (e.g., a switching-on signal of the RF-to-DC elements 213 connected in parallel), and a serial stage control signal of the serial RF-to-DC converting module (e.g., a switching-on signal of the RF-to-DC elements 213 connected in series) according to an input of the characteristic signals.

In addition, the RF reception controller 270 may output, to the DC-to-DC converter 220, a control signal for controlling the number of power stages to be connected to the DC voltage of the RF-to-DC converter 210 inside the DC-to-DC converter 220 according to the voltage level of the DC voltage output from the RF-to-DC converter 210 (e.g., a voltage level measured through a voltage detector for a DC voltage received from the RF-to-DC converter 210 and an ADC of a detected DC voltage).

As shown in FIG. 4B, a multi-core DC-to-DC converter 220 applies a maximum power point tracking (MPPT) algorithm to an internal feedback loop, optimizes power conversion efficiency according to an input from the RF-to-DC converter 210 (a DC-to-DC input in FIG. 4B), and outputs converted DC power (DC-DC OUT of FIG. 4B).

Figure 4:
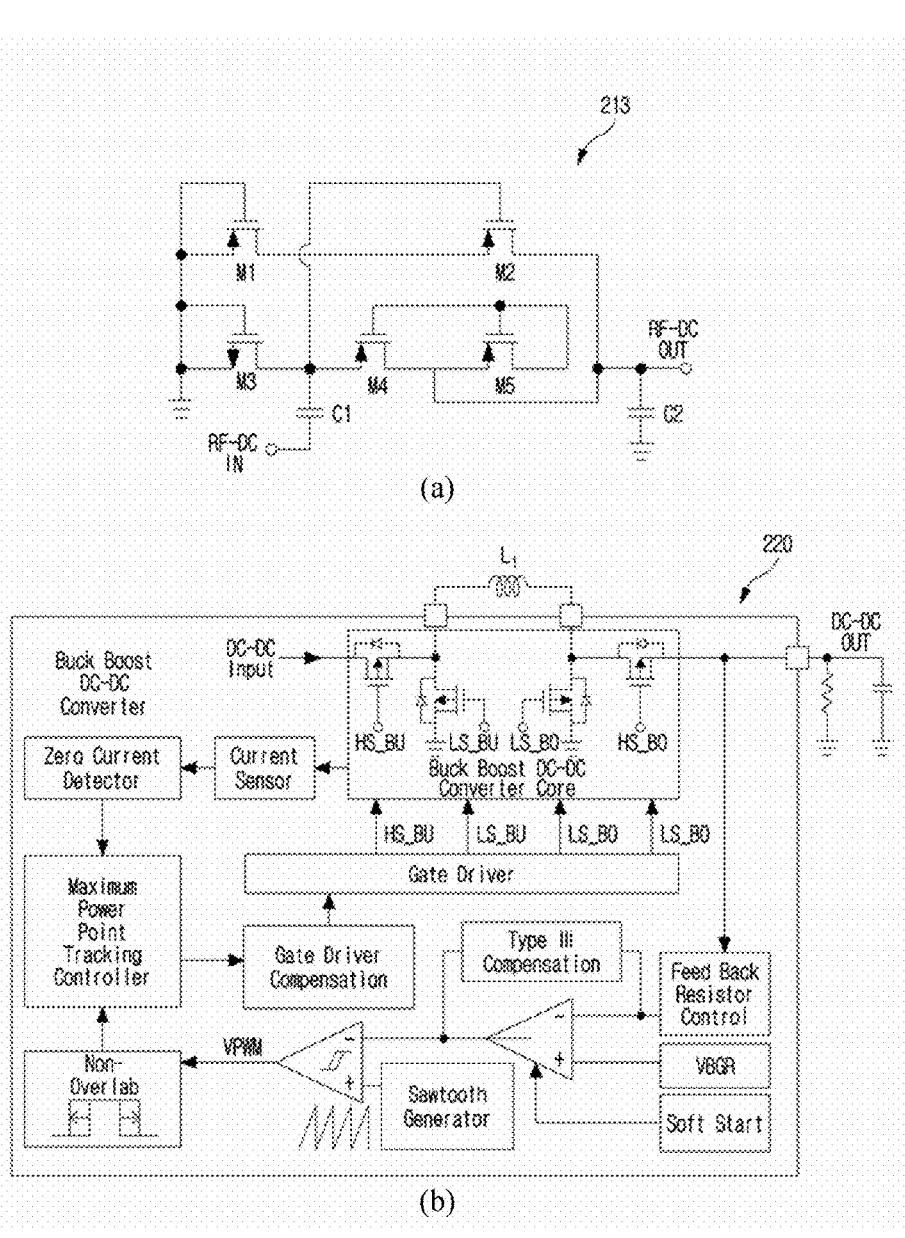
FIG. 4 is a diagram showing an exemplary circuit configuration of a radio frequency (RF)-to-direct current (DC) element and an exemplary circuit configuration of a DC-to-DC converter.

By the wireless power receiver 200 described through FIGS. 2 to 4, it is possible to notify the wireless power transmitter 100 of a power reception state of the wireless power receiver 200 in response to the recognition of an RF signal without consumption of fixed power. Also, the wireless power receiver 200 outputs a response signal optimized for power to the wireless power transmitter 100 according to its own power state or the received power state. By applying artificial intelligence technology using the analog PIM, the wireless power receiver 200 is capable of fast feedback and efficient power adaptation. Also, by using the AM signal as a response signal, the wireless power receiver 200 has a simple circuit configuration and enables wireless power reception feedback with low power.

Figure 5:
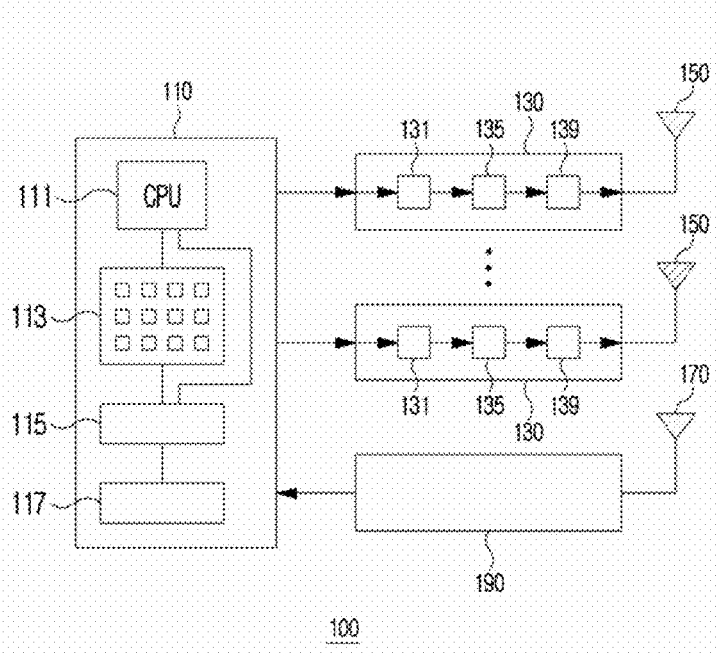
FIG. 5 is a diagram showing an exemplary block diagram of a wireless power transmitter.

FIG. 5 is a diagram showing an exemplary block diagram of the wireless power transmitter 100.

According to FIG. 5, the wireless power transmitter 100 includes an RF transmission controller 110, a plurality of wireless power transmitting modules 130, a plurality of RF transmitting antennas 150, one or more AM receiving antennas 170, and a feedback receiving module 190. The wireless power transmitter 100 is installed in production facilities or equipments such as factories, business sites, and work sites or may be installed in private residences such as apartments and detached houses or in public places to transmit an RF signal for wireless power charging to the wireless power receiver 200 capable of wireless charging through a plurality of RF transmitting antennas 150.

The RF signal output from the wireless power transmitter 100 is a signal that is output for wireless power transmission in the 900 MHZ, 2.4 GHz, or 5.8 GHz band. The RF transmission controller 110, the plurality of wireless power transmitting modules 130, and the feedback receiving module 190 of the wireless power transmitter 100 are embedded in a single integrated circuit (IC) for RF signal-based wireless power transmission. The wireless power transmitter 100 may be implemented to include a mechanism for housing the single IC, a plurality of RF transmitting antennas 150 and AM reception antennas 170 installed on a surface of the mechanism, and a power source for supplying AC power or DC power.

The configuration of the wireless power transmitter 100 will be described in detail below with reference to FIG. 5. Each of the RF transmitting antennas 150 wirelessly transmits an RF signal for wireless power charging in the wireless power receiver 200. The RF transmitting antenna 150 transmits an RF signal in a specific frequency band. The RF transmitting antenna 150 may transmit RF signals in, for example, ISM bands such as the 900 MHz band, the 2.4 GHz band, and/or the 5.8 GHz band. Each of the RF transmitting antennas 150 may be, for example, a patch antenna with directivity.

The plurality of wireless power transmitting modules 130 are connected to the plurality of RF transmitting antennas 150 to output generated wireless power to the connected RF transmitting antennas 150. The plurality of wireless power transmitting modules 130 are configured to enable RF beam steering and are configured to target wireless power toward a wireless power receiver 200 at a specific location and then transmit the wireless power. To this end, each wireless power transmitting module 130 is configured to at least adjust the phase and signal strength of an RF signal output through the RF transmitting antenna 150, and the plurality of wireless power transmitting modules 130 and the plurality of RF transmitting antennas 150 are capable of beam steering.

Each of the wireless power transmitting modules 130 is configured to include a phase-locked loop (PLL) 131, a phase shifter 135, and a power amplifier 139. The PLL 131, which generates an RF signal in a designated ISM band, is a multi-band PLL configured to generate RF signals in the 900 MHZ, 2.4 GHZ, or 5.8 GHz ISM band.

Figure 6:
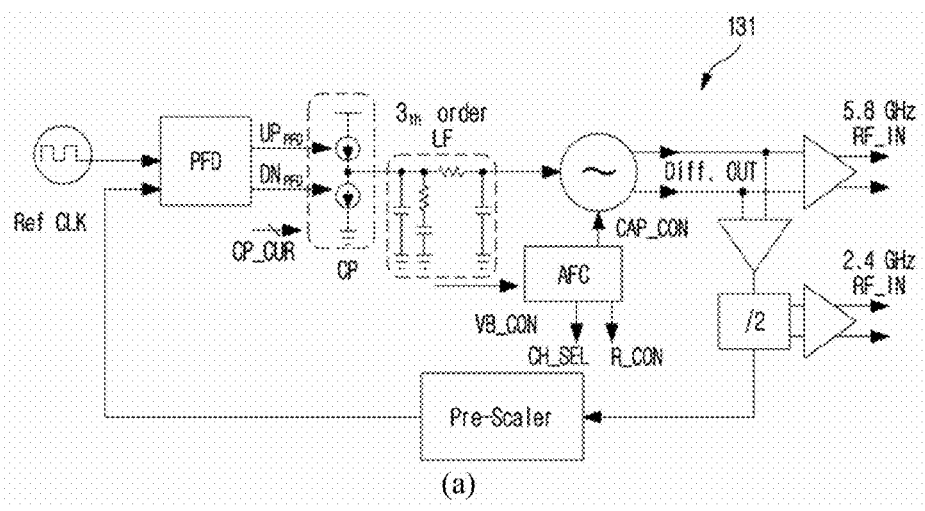
FIG. 6 is a diagram showing an exemplary circuit configuration of a power amplifier and a phase-locked loop (PLL) of a wireless power transmitter.
Figure 6:
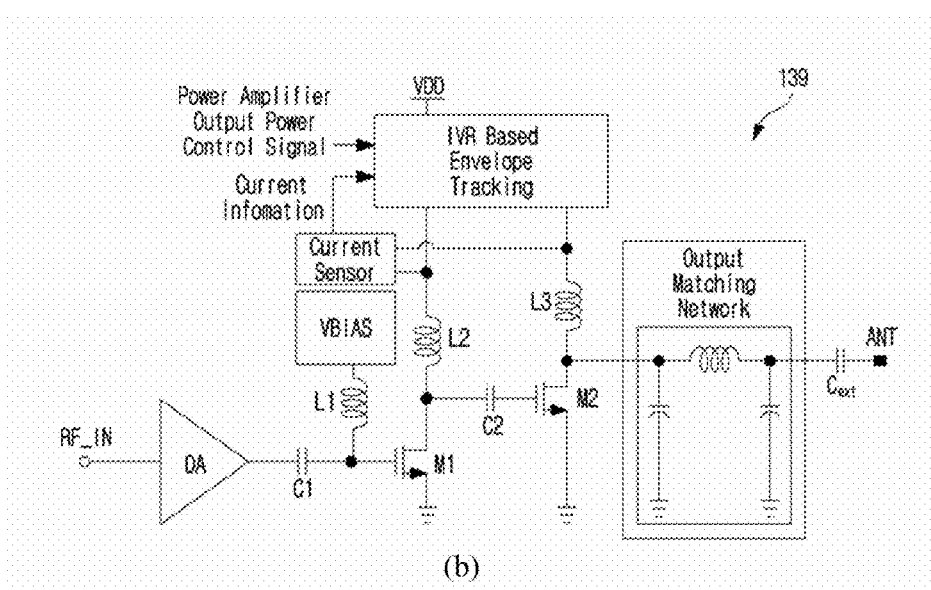

As in the example of FIG. 6A, the PLL 131 includes a phase frequency detector (PFD), a charge pump (CP), a loop filter (LF), a voltage-controlled oscillator (VCO), a half divider, and a pre-scaler (or a fractional-N divider) and the like to generate a 2.4 GHz band signal or a 5.8 GHz band signal from a reference clock signal (Ref CLK) through the VCO and output the signal to the phase shifter 135 (5.8 GHz RF_IN and 2.4 GHz RF_IN in FIG. 6A). The PLL 131 selects a signal of a specific band according to a PLL control signal received from the RF transmission controller 110 and outputs the selected signal to the phase shifter 135.

The phase shifter 135 is connected to the PLL 131 to shift the phase of an RF signal output from the PLL 131 and output the phase-shifted RF signal. The phase shifter 135 shifts the phase of an input RF signal according to a phase control signal received from the RF transmission controller 110 and outputs the phase-shifted RF signal to the power amplifier 139.

As in the example of FIG. 6B, the power amplifier 139 amplifies an RF signal RF_IN applied from the phase shifter 135 and outputs the RF signal RF_IN to a connected RF transmitting antenna ANT 150. The power amplifier 139 embedded in the single IC includes multiple inductors L1, L2, and L3, a current sensor, and a transistor therein. Thus, the power amplifier 139 amplifies and outputs an input RF signal according to a power amplifier output power control signal received from the RF transmission controller 110.

An integrated voltage regulator (IVR)-based envelope tracking circuit may perform output power control of high-speed response according to the power control signal received from the RF transmission controller 110 and the current consumption inside the power amplifier 139 through the current sensor. The IVR-based envelope tracking circuit can optimize power efficiency using a high voltage low-dropout (LDO), a charge pump, or a buck-boost converter.

One or more AM receiving antennas 170 recognize (receive) an AM signal from the wireless power receiver 200. The AM receiving antenna 170 may recognize an AM signal of a specific single-tone frequency or may recognize an AM signal of a multi-tone frequency. The wireless power transmitter 100 may include a single AM receiving antenna 170 to receive a single-tone or a multi-tone AM signal from the single AM receiving antenna 170. Alternatively, the wireless power transmitter 100 may include a plurality of AM receiving antennas 170 and is configured to receive a multi-tone AM signal from each of the AM receiving antennas 170.

The feedback receiving module 190 receives an AM signal from one or more wireless power receivers 200 through one or more connected AM receiving antennas 170 and extracts power information of the wireless power receiver 200 that has transmitted the AM signal from the received AM signal.

The feedback receiving module 190 extracts an identifier, received-power information, and stored-power information from a single-tone or multi-tone AM signal according to a transmission (signal) format (protocol) agreed with the wireless power receiver 200 and outputs the extracted analog or digital identifier, received-power information, and stored-power information to the RF transmission controller 110.

The received-power information includes data for specifying the amount of energy of the wireless power harvested by the wireless power receiver 200 from RF signals transmitted through the plurality of RF transmitting antennas 150 of the wireless power transmitter 100. For example, the received-power information is configured to include the energy level, phase, and peak-to-average power ratio of the recognized RF signal in a specific number of bits according to an agreed format. In addition or alternatively, the received-power information is configured to include data indicating the amount of power received (harvested) from the recognized RF signal.

The stored-power information includes data for specifying the amount of battery charge stored in the wireless power receiver 200. For example, the stored-power information indicates the remaining power level of the battery (supercapacitor 230) of the wireless power receiver 200 and is included in a specific number of bits according to an agreed format. The identifier of the wireless power receiver 200 may be formed as a serial number, a MAC address, or a combination of numbers and characters.

The feedback receiving module 190 senses an AM signal having a variable amplitude greater than or equal to an internally set lower limit amplitude, decodes and extracts an identifier, received-power information, and stored-power information from the sensed AM signal according to a signal (data) encoding scheme agreed with the wireless power receiver 200, and outputs the extracted identifier, received-power information, and stored-power information to the RF transmission controller 110. The feedback receiving module 190 is configured to include a circuit, logic, and the like for extracting an identifier, received-power information, and stored-power information from an AM signal.

The RF transmission controller 110 recognizes the locations of one or more wireless power receivers 200 that have transmitted an AM signal on the basis of the identifier, received-power information, and stored-power information extracted from the received AM signal, controls the plurality of wireless power transmitting modules 130 according to the recognized locations, and transmits wireless power as an RF signal.

To this end, the RF transmission controller 110 is configured to further include a central processing unit 111, an AI engine block 113, a memory 117, and a bit compressor 115 as shown in the example of FIG. 5.

The memory 117 includes a volatile memory and/or a non-volatile memory to store various kinds of data and programs. The memory 117 stores a plurality of artificial intelligence model programs driven in the central processing unit 111, various kinds of data used in the artificial intelligence model program (e.g., various weights used in the convolution layer), various kinds of result data generated by the artificial intelligence model program, and various kinds of data collected from the wireless power receiver 200. In this way, the memory 117 stores various kinds of data related to the execution of the artificial intelligence model.

The AI engine block 113 accelerates the execution of the artificial intelligence algorithm. The AI engine block 113 may be configured to include a hardware logic implemented to independently perform all or some of the functions performed in various artificial intelligence models or a specific artificial intelligence model, in parallel independently instead of sequential instruction sequences of a program. The AI engine block 113 includes a hardware logic of a gate unit implemented to perform, for example, a convolution function, an activation function, a plattering function, and the like, and computes input data and outputs the computation result according to a control signal received from the central processing unit 111.

The bit compressor 115 compresses data to be stored in the memory 117 and decompresses the compressed data through the control of the central processing unit 111. For example, under the control of the AI engine block 113 or the central processing unit 111, the bit compressor 115 may compress output data output as the execution result of the artificial intelligence model, location information of the wireless power receiver 200, and various kinds of weights used in the artificial intelligence model and store the compressed data in the memory 117 and may decompress the compressed data stored in the memory 117 and output the decompressed data to the AI engine block 113 or the central processing unit 111. The bit compressor 115 may compress input data according to a compression control signal received from the central processing unit 111 or the AI engine block 113 and output the compressed data to the memory 117.

The central processing unit 111 executes the artificial intelligence model program stored in the memory 117 and controls the plurality of wireless power transmitting modules 130 according to the location and priority of a wireless power receiver 200 determined due to the execution of the artificial intelligence model program so that their beam steering is toward the specific wireless power receiver 200. The central processing unit 111 recognizes the location and priority of the wireless power receiver 200 through the execution of the artificial intelligence model program configured to execute program instructions and accelerated by the AI engine block of the memory 17 and controls the plurality of wireless power transmitting modules 130 so that a wireless power receiver 200 selected through the recognition can receive optimal RF signal beams.

Figure 7:
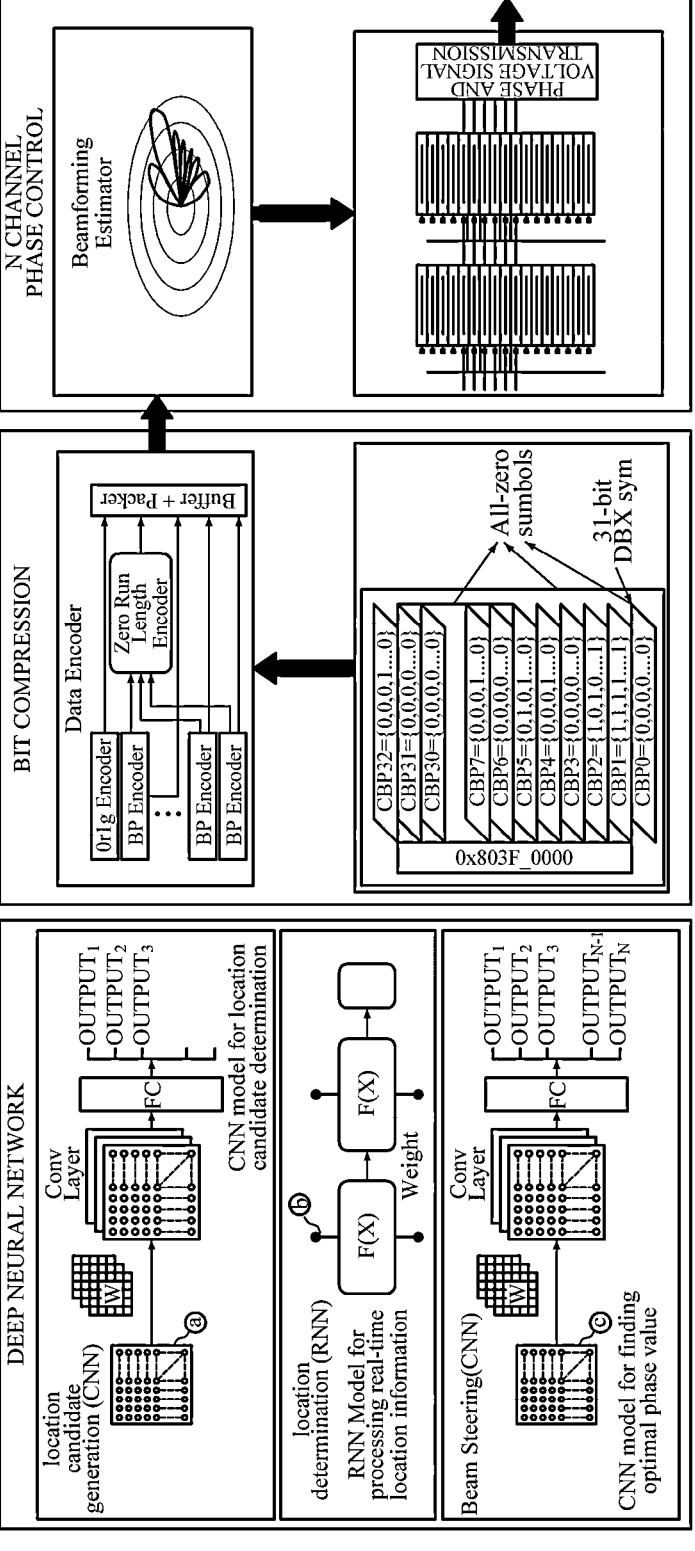
FIG. 7 is a diagram showing a main control flow for controlling beam steering according to an estimated location of a wireless power receiver by using a plurality of artificial intelligence models in a wireless power transmitter.

FIG. 7 is a diagram showing a main control flow for controlling beam steering according to an estimated location of the wireless power receiver 200 by using a plurality of artificial intelligence models in the wireless power transmitter 100.

Like the main control flow of FIG. 7, the central processing unit 111 of the RF transmission controller 110 is configured to execute three artificial intelligence models stored in the memory 117 through the AI engine block 113, recognize the location of the wireless power receiver 200, and steer the beams of an RF signal toward the specific wireless power receiver 200 according to priority assigned according to received-power information.

First, the central processing unit 111 executing a plurality of artificial intelligence models by controlling the AI engine block 113 determines location candidates by using received-power information received from the wireless power receiver 200 according to a convolutional neural network (CNN) model for generating a location candidate.

For example, the central processing unit 111 executing a CNN model for location candidate generation receives an identifier, received-power information, and stored-power information extracted from an AM signal from the feedback receiving module 190 during a designated time window (e.g., 10 msec) and thus determines location candidates for the wireless power receiver 200 corresponding to the identifier. By using the received-power information as individual input data (see Ⓐ in FIG. 7), the central processing unit 111 may determine location candidates for each wireless power receiver 200 corresponding to the identifier during the designated time window. Alternatively, by using the received-power information corresponding to the identifier recognized during the designated time window as an input matrix (see Ⓐ in FIG. 7), the central processing unit 111 may determine location candidates for each wireless power receiver 200 corresponding to the identifier.

The central processing unit 111 may determine location candidates for each wireless power receiver 200 by comparing the energy level, phase, and peak-to-average power ratio of the received-power information and the phases and signal strength of RF signals output through the plurality of wireless power transmitting modules 130 during a designated time window. The central processing unit 111 may determine the location candidates by using the phase and signal strength of the RF signals output from the plurality of wireless power transmitting modules 130 as a weight or a factor for configuring a weight of the CNN model.

Subsequently, the central processing unit 111 performing a recursive neural network (RNN) model for positioning determines the location of the wireless power receiver 200 identified through the AM signal using the determined location candidates as an input (see Ⓑ of FIG. 7). The central processing unit 111 determines the real-time location of each wireless power receiver 200 using candidate locations of each wireless power receiver 200 and locations determined on a previously designated time window (as a weight).

The RF transmission controller 110 may dynamically track the location of the wireless power receiver 200 by comparing the received-power information extracted from the AM signal to the characteristics of the RF signal transmitted according to the control signal output to the plurality of wireless power transmitting modules 130.

When the location of each wireless power receiver 200 is determined, the central processing unit 111 performing the CNN model for beam steering determines the priorities of the wireless power receivers 200 on the basis of the stored-power information further received from the wireless power receivers 200 through the AM signal and determines output data such as the phase value and amplification value of each of the plurality of wireless power transmitting modules 130 for transmitting RF signal beams toward the wireless power receiver(s) 200 having the highest priority (or belonging to the highest priority group) among the determined priorities.

The central processing unit 111 that receives the determined location of each wireless power receiver 200 as an input (see ⓒ in FIG. 7) may determine the wireless power receiver 200 having the lowest stored-power level as the wireless power receiver 200 having the highest priority on the basis of the stored-power information received from each of the wireless power receiver 200 and generate output data such as the phase value and the amplification value for transmitting RF signal beams to the location area of the wireless power receiver 200 determined to have the highest priority. Alternatively, the central processing unit 111 may add up the stored-power levels of wireless power receivers 200 located in each location area, determine the wireless power receivers 200 located in a location area having the lowest aggregate stored-power level to have the highest priority, and generate output data such as the phase value and amplification value for transmitting RF signal beams to the corresponding location area.

The central processing unit 111 may control the plurality of wireless power transmitting modules 130 according to the output data and accordingly transmit an RF signal beam for wireless power charging toward a selected wireless power receiver 200. Thus, the wireless power transmitter 100 may dynamically recognize and track the wireless power receiver 200 that has low stored power and requires additional wireless charging among the wireless power receivers 200 recognized through the AM signal and may transmit an RF beam toward the corresponding wireless power receiver 200.

In order to transmit an RF signal beam to the location area of the wireless power receiver 200 having the highest priority according to the output data, the central processing unit 111 composes a PLL control signal, a phase control signal, and a power control signal for generating an RF signal of a frequency in a specific ISM band as output data and outputs the output data to each wireless power transmitting module 130 (see N-channel phase control of FIG. 7). Accordingly, an RF signal that is transmitted through each wireless power transmitting module 130, of which the phase is shifted, and of which the power is controlled may be transmitted in a specific direction.

The central processing unit 111 repeatedly (e.g., repeatedly in units of a designated time window) performs location candidate generation, positioning, and beam steering processes through multiple artificial intelligence models, track the location of each wireless power receiver 200, and transmit an RF signal for wireless power charging toward the wireless power receiver 200 in a specific location area according to a priority assigned to each designated time window.

While adjusting and transmitting an RF signal beam to the wireless power receiver 200 (in the location area) targeted in one specific time window, the central processing unit 111 matches and stores identifiers, received-power information, and stored-power information received from one or more wireless power receivers 200 during a subsequently designated time window and the output data determined during a previously designed time window.

The matched output data and received-power information are then used as real-time training data for a plurality of artificial intelligence models by the central processing unit 111. To this end, the central processing unit 111 evaluates the subsequent received-power information using the previously transmitted output data. The central processing unit 111 may calculate an evaluation result (for example, a ratio) by comparing expected reception power at the determined location of each wireless power receiver 200 according to the transmission of the RF signal corresponding to the output data and received-power information transmitted according to actual measurement in the subsequent time window. The central processing unit 111 may calculate an evaluation result for each wireless power receiver 200 or may calculate an evaluation result for a specific targeted wireless power receiver 200.

The central processing unit 111 provides the matched output data and received-power information and the evaluation result to a CNN model for location candidate generation, an RNN model for subsequent positioning, and a CNN model for subsequent beam steering to train the CNN models and the RNN model in real time. The central processing unit 111 may train a plurality of artificial intelligence models for each time window in real time or may collect matched data for each of a plurality of time windows during a designated period and then train the plurality of artificial intelligence models.

The central processing unit 111 or the AI engine block 113 may compress various kinds of data and store the compressed data in the memory 117. As in the example of FIG. 8, the RF transmission controller 110 includes a bit compressor 115, and the central processing unit 111 (or the AI engine block 113) controls the bit compressor 115 to compress various kinds of data, stores the compressed data in the memory 117, decompresses the compressed data, and processes the decompressed data.

The central processing unit 111 (or the AI engine block 113) may compress, for example, output data determined in each time window, weights of an artificial intelligence model used in each time window, and various kinds of information received from the wireless power receiver 200 and then may store the compressed information in the memory 117. Accordingly, the wireless power transmitter 100 can maximize the amount of data collected or stored by overcoming the capacity limit of the memory 117. As an experimental result, it was confirmed that a data compression ratio was about two times or more.

The central processing unit 111 (or the AI engine block 113) may compress data through the bit compressor 115 and then store the compressed data in the memory 117 or store raw data in the memory 117 not via the bit compressor 115.

Figure 8:
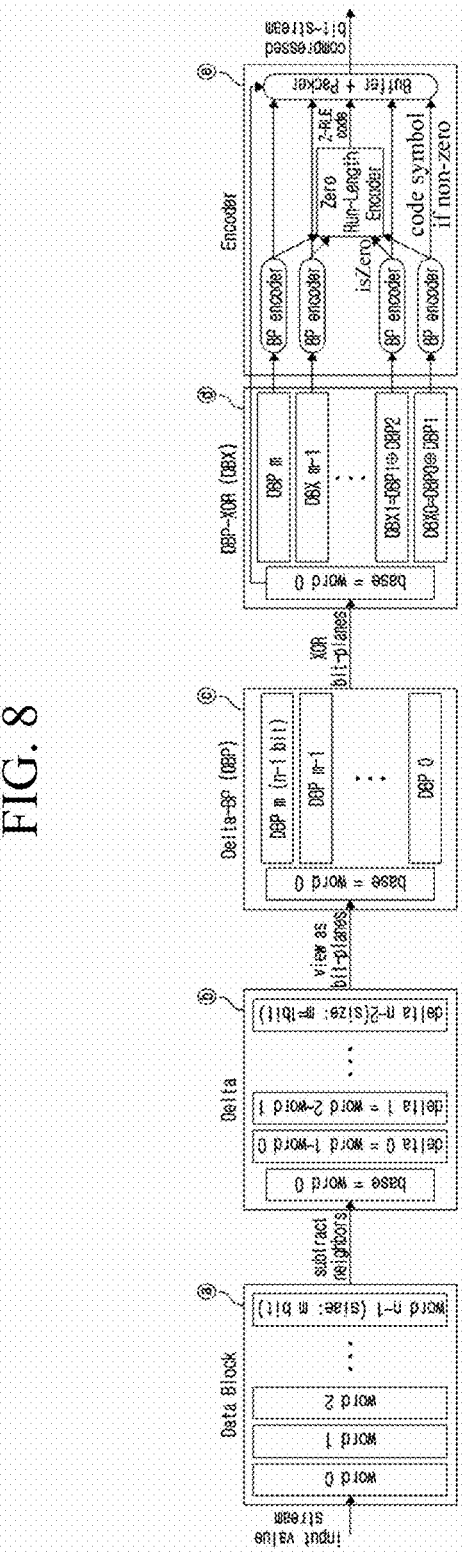
FIG. 8 is a diagram showing an exemplary configuration illustrating a compression flow of a bit compressor.

The bit compressor 115 is configured or implemented with a hardware logic, and FIG. 8 is a diagram schematically illustrating a compression flow of the bit compressor 115 implemented with a hardware logic. First, the bit compressor 115 calculates the differences (see ⓑ in FIG. 8) between adjacent words (word 1 to word n−1) other than the first word (word 0) of a data block (e.g., a weight (matrix) or output data (matrix)) to be compressed (see ⓐ in FIG. 8).

The bit compressor 115 transforms delta words (Delta 0, 1, . . . , n−2) of the calculated differences into bit plane words (see ⓒ). The bit compressor 115 converts a series of (n) 0 bits of each delta word into a 0th bit plane word (see DBP 0 in ⓒ) and converts a series of (n) mth bits of each delta word into the mth bit plane word (see DBP m in ⓒ).

The bit compressor 115 performs an XOR operation on adjacent words of the transformed bit plane (see ⓓ). The bit compressor 115 performs a bitwise XOR operation between each of the remaining bit plane words except one bit plane (e.g., DBP m of ⓓ) and its adjacent bit play word (e.g., DBP 0 XOR DBP 1) to generate an XORed bit plane word to have a bit-correlation with the adjacent bit plane word.

Each of the XORed bit plane words DBX 0 to DBX m−1 and the bit plane words DBP m is compressed through a bit plane (BP) encoder and a zero-run-length encoder. The compressed data and a base word (word 0) are packed (Buffer+Packet in FIG. 8) and output (see ⓔ in FIG. 8), and the output compressed data is stored in the memory 117.

The encoder of the bit compressor 115 is configured to include a bit plane encoder, a zero-run length encoder, and a buffer and packer to compress and output the bit plane words DBX 0 to DBX m−1, the bit plane words DBP m, and the base word.

Each bit-plane encoder compresses non-zero data bits out of an input bit-plane word (DBX 0 to DBX m−1) or DBP m and forwards a series of bit-zero data bits to the zero-run-length encoder. The zero-run length encoder compresses and outputs a series of bit-zero data bits.

The buffer and packer packs and outputs the compressed data received from each bit plane encoder, the compressed data from the zero-run length encoder, and the base word according to an internal format.

The bit compressor 115 may compose differences between the successive words, store the data on the basis of the first word, and compress the data to be stored. The proposed bit compressor 115 is applicable to integers of various word lengths. In particular, it is possible to increase the compression ratio by preferably applying the bit compressor 115 to a floating point word that is difficult to compress. In a floating point word, since symbols for both an exponent bit and a sign bit are all 0s in many cases, it is possible to improve the compression ratio using the structure of the bit compressor 115 proposed in the present invention.

With the wireless power transmitter 100 described with reference to FIGS. 5 to 8, the priority charging of the prioritized wireless power receiver 200 according to the dynamic tracking and the battery status of the wireless power receiver 200 and the fast beamforming according to the reduction of stored data and the tracking of the wireless power receiver 200 are possible. Furthermore, the wireless power transmitter 100 enables simultaneous charging of the wireless power receivers 200 having mobility, thereby enabling the free movement of IoT devices (sensors). Accordingly, the wireless power charging system including the wireless power transmitter 100 may implement a smart form, a smart factory, or a smart city according to the 4th industrial revolution.

With the wireless power transmitter, the wireless power receiver, and the wireless power charging system according to the present invention, it is possible to dynamically maximize wireless power charging efficiency in response to external environmental changes using artificial intelligence technology.

Also, with the wireless power transmitter, the wireless power receiver, and the wireless power charging system according to the present invention, it is possible to optimize consumed power based on received wireless power and an internal power state and minimize energy waste for wireless power charging in the wireless power receiver.

Also, with the wireless power transmitter, the wireless power receiver, and the wireless power charging system according to the present invention, it is possible to dynamically estimate the location of the wireless power receiver on the basis of an RF signal transmitted and an RF signal received in response to the transmitted RF signal and dynamically determine the charging priority of the wireless power receiver according to the received RF signal using artificial intelligence technology.

Also, with the wireless power transmitter, the wireless power receiver, and the wireless power charging system according to the present invention, it is possible to dynamically increase wireless power charging efficiency by training an artificial intelligence technology algorithm for performing location estimation, location determination, and beam steering for wireless power transmission using transmitted RF signals and received RF signals.

Also, the wireless power transmitter, the wireless power receiver, and the wireless power charging system according to the present invention, it is possible to minimize the time required for the dynamic change of a wireless power output according to a change in priority caused by the location tracking and power statues of the wireless power receiver and a corresponding response time.

Effects of the invention are not limited to the aforementioned effects, and other effects that are not described herein should be clearly understood by those skilled in the art from the following description.

The present invention, which has been described above, can be substituted, modified, and changed by those skilled in the art in various ways without departing from the technical spirit of the present invention, and thus is not limited by the above-described embodiment and the accompanying drawings.

What is claimed is:

1. A wireless power receiver comprising:
a radio frequency (RF) signal detector configured to detect one or more characteristics of an RF signal through an RF receiving antenna;
an RF reception controller configured to compose and output received-power information based on the detected characteristics;
a backscatter modulator configured to encode the received-power information received from the RF reception controller into an amplitude modulation (AM) signal and output the AM signal to an AM transmitting antenna;
a radio frequency (RF)-to-direct current (DC) converter configured to convert the RF signal into a DC voltage;
a supercapacitor charged according to the DC voltage received from the RF-to-DC converter; and
a power detector configured to detect a power level stored in the supercapacitor,
wherein the RF reception controller further composes stored-power information corresponding to the power level received from the power detector, and the backscatter modulator encodes an identifier, the received-power information, and the stored-power information into an AM signal and outputs the AM signal to the AM transmitting antenna, and
wherein the RF reception controller outputs, to the backscatter modulator, a control signal for outputting a multi-tone AM signal or a control signal for outputting a single-tone AM signal according to received wireless power based on the detected characteristics when the power level detected by the power detector is greater than or equal to a set threshold power level.

2. The wireless power receiver of claim 1, wherein the RF signal detector, the RF reception controller, and the backscatter modulator are embedded in a single integrated circuit (IC) for wireless power charging through the RF signal, and the RF signal is a signal in an industrial, scientific, and medical (ISM) band.

3. The wireless power receiver of claim 1, wherein the RF reception controller outputs a control signal for stopping the backscatter modulator from outputting the AM signal when the received wireless power is less than the second set threshold.

4. The wireless power receiver of claim 1, wherein the RF reception controller, which includes an analog process in memory (PIM), generates a control signal corresponding to one or more characteristics received from the RF signal detector through a convolutional neural network (CNN) artificial intelligence algorithm that uses a convolution operation of the analog PIM and outputs the control signal to the RF-to-DC converter and the backscatter modulator.

5. The wireless power receiver of claim 4, wherein the RF-to-DC converter comprises a parallel RF-to-DC converting module in which a plurality of RF-to-DC elements are disposed in parallel, a serial RF-to-DC converting module in which a plurality of RF-to-DC elements are disposed in series, and a selective output module configured to output the RF signal received from the RF receiving antenna to the parallel RF-to-DC converting module or the serial RF-to-DC converting module according to a mode control signal.

\* \* \* \* \*